US012681509B2

(12) United States Patent
Mlsna et al.

(10) Patent No.: US 12,681,509 B2
(45) Date of Patent: Jul. 14, 2026

(54) DEVICES, SYSTEMS, AND METHODS FOR CONTROLLING LIQUID LEVELS USING ISOLATION RESISTANCE

(71) Applicant: Trane International Inc., Davidson, NC (US)

(72) Inventors: Eric S. Mlsna, Cashton, WI (US); Jonathan Rollier, Chanhassen, MN (US)

(73) Assignee: Trane International Inc., Davidson, NC (US)

( * ) Notice: Subject to any disclaimer, the term of this patent is extended or adjusted under 35 U.S.C. 154(b) by 213 days.

(21) Appl. No.: 18/491,745

(22) Filed: Oct. 20, 2023

(65) Prior Publication Data

US 2025/0130602 A1 Apr. 24, 2025

(51) Int. Cl.
*G05D 9/00* (2006.01)
*G01F 23/00* (2022.01)
*G01F 23/24* (2006.01)

(52) U.S. Cl.
CPC ........... *G05D 9/00* (2013.01); *G01F 23/0007* (2013.01); *G01F 23/24* (2013.01)

(58) Field of Classification Search
CPC ........ G01F 23/0007; G01F 23/24–244; G05D 9/00
See application file for complete search history.

(56) References Cited

U.S. PATENT DOCUMENTS

| | | | |
|---|---|---|---|
| 7,360,418 B2 * | 4/2008 | Pelovitz | A47J 31/4457 73/304 C |
| 10,274,356 B2 | 4/2019 | Hirata et al. | |
| 10,658,714 B2 | 5/2020 | Grace et al. | |
| 11,764,409 B2 * | 9/2023 | Lettner | H01M 10/4228 429/93 |
| 12,166,250 B2 * | 12/2024 | McClory | H01M 8/04656 |
| 2011/0239672 A1 | 10/2011 | Won et al. | |

FOREIGN PATENT DOCUMENTS

| | | |
|---|---|---|
| EP | 3028013 B1 | 3/2020 |
| JP | 6589843 B2 | 6/2018 |

* cited by examiner

*Primary Examiner* — Justin N Olamit
(74) *Attorney, Agent, or Firm* — Womble Bond Dickinson (US) LLP

(57) ABSTRACT

Devices, systems, and methods are disclosed for reducing leakage current in compressors, such as for heating, ventilation, and air conditioning, and refrigeration (HVAC/HVACR) systems. Several embodiments include a sensor for measuring the isolation resistance of an enclosure of a compressor. The sensor can be electronically coupled to a controller that is configured to activate a heating element mechanically coupled to the enclosure when the controller determines that the isolation resistance measured by the sensor falls indicates that the compressor is at risk of faulting. Activating the heating element causes the refrigerant mixed within the oil to evaporate, which lowers the liquid level within the compressor.

17 Claims, 5 Drawing Sheets

DEVICES, SYSTEMS, AND METHODS FOR CONTROLLING LIQUID LEVELS USING ISOLATION RESISTANCE

TECHNOLOGICAL FIELD

The present disclosure relates generally to improved devices, systems, and methods for mitigating and minimizing fault in heating, ventilation, and air conditioning, and refrigeration (HVACR) (and other similar cooling system) compressors to reduce downtime of the compressors and the overall HVACR system.

BACKGROUND

Generally, HVAC/HVACR systems are used to heat and/or cool building spaces and/or used to transport cooled and frozen products. Such building spaces include single story and multi-story schools, office buildings, and manufacturing facilities, for example. Similar cooling systems can also be found on electrical vehicles for battery management and passenger comfort, and on refrigerated trailers and trucks for the transport of cooled and frozen products. Such cooling systems usually include a compressor that circulates and compresses a working fluid (e.g., one or more refrigerants) that flows through the cooling system.

High liquid levels within the compressor can cause the refrigeration system to fault. The present disclosure seeks to avoid or minimize such faults.

BRIEF SUMMARY

Embodiments disclosed herein includes a method, apparatus, and system for controlling liquid levels within the compressor by monitoring the isolation resistance of the compressor.

Devices, systems, and methods are disclosed for controlling liquid levels within a compressor, such as for HVAC systems, by monitoring an isolation resistance of the compressor. Several embodiments include a sensor for measuring the isolation resistance of an enclosure (e.g., housing) of a compressor. In some embodiments, a first terminal of the sensor is connected to a power terminal (e.g., a power unit) of the compressor while a second terminal of the sensor is grounded to an outer shell of the enclosure. The sensor is also electronically coupled to a controller (e.g., a control unit). The controller can be used to activate a heating element that is mechanically coupled to the enclosure of the compressor when the controller determines that the isolation resistance measured (e.g., sensed) by the sensor falls below a predetermined threshold (e.g., a threshold indicating the that liquid level within the compressor is at a level close to a point where the compressor is at risk of faulting). Activating the heating element causes the refrigerant mixed within the oil to evaporate, which in turn effectively lowers the liquid level within the compressor.

The present disclosure thus includes, without limitation, the following example embodiments. Some example implementations include a method comprising: obtaining a first measurement comprising a first isolation resistance of an enclosure, wherein the first isolation resistance is measured between a power unit and an outer shell of the enclosure; using the first isolation resistance to determine a liquid level of one or more liquids contained within the enclosure; and controlling the liquid level, wherein the controlling comprises performing one or more actions based on the liquid level.

Other example implementations include an apparatus comprising: a memory; and a processor coupled to the memory, wherein the processor is configured to: obtain a measurement comprising an isolation resistance of an enclosure, wherein the isolation resistance is measured between a power unit and an outer shell of the enclosure; use the isolation resistance to determine a liquid level of one or more liquids contained within the enclosure; and control the liquid level, wherein the controlling comprises performing one or more actions based on the liquid level.

Still other implementations include a system comprising: an enclosure; and an apparatus. The apparatus comprising: a memory; and a processor coupled to the memory, wherein the processor is configured to: obtain a measurement comprising an isolation resistance of an enclosure, wherein the isolation resistance is measured between a power unit and an outer shell of the enclosure; use the isolation resistance to determine a liquid level of one or more liquids contained within the enclosure; and control the liquid level, wherein the controlling comprises performing one or more actions based on the liquid level.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise.

BRIEF DESCRIPTION OF THE SEVERAL VIEWS OF THE DRAWINGS

For a detailed description of various exemplary embodiments, reference will now be made to the accompanying drawings in which.

DETAILED DESCRIPTION

Figure 1:
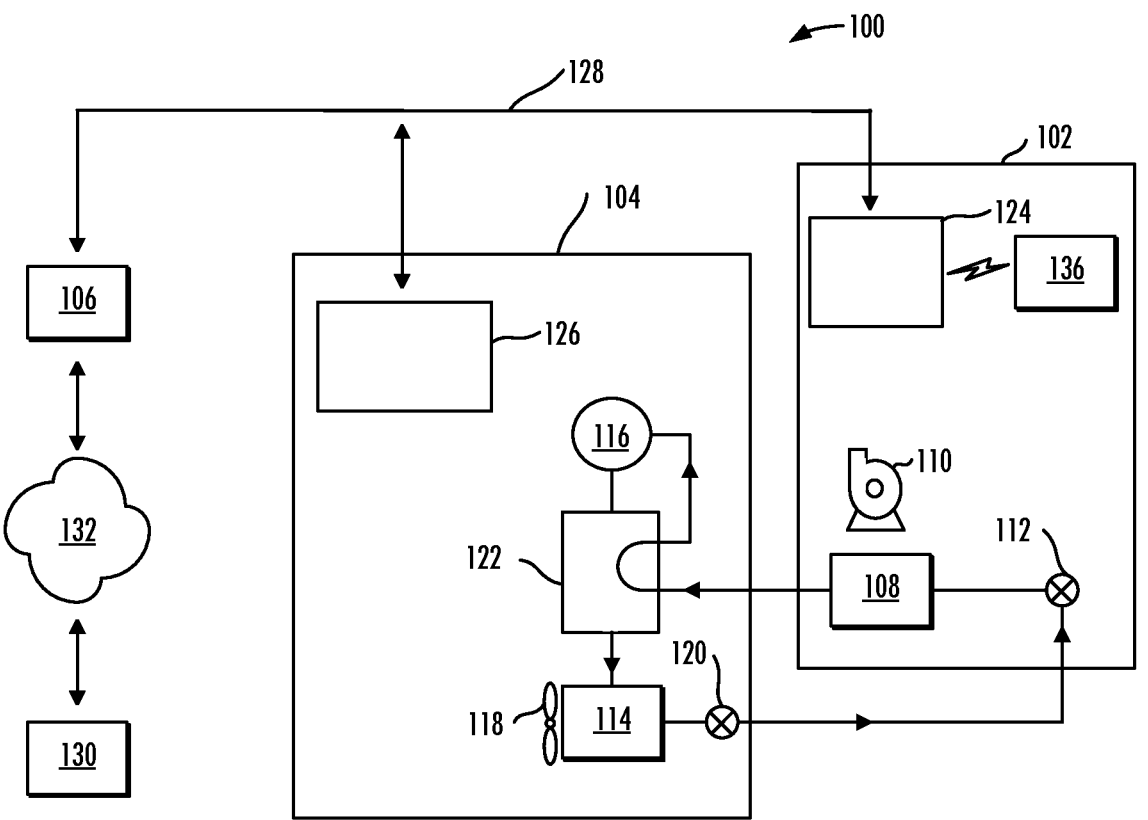
FIG. 1 illustrates certain aspects of an HVAC system, according to some example implementations of the present disclosure.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. Further, when used herein (including in the claims), the words "about," "generally," "substantially," "approximately," and the like mean within a range of plus or minus 10% unless otherwise stated herein.

Generally, HVAC/HVACR systems (and other similar cooling systems used in electrical vehicles such as scroll compressors for transport) are used to heat and/or cool building spaces. These systems can vary in complexity, but they often include a refrigerant circuit used to transfer thermal energy into and out of a working fluid, which is typically one or more refrigerant fluids. These systems typically use a compressor to circulate the working fluid through the refrigerant circuit. As part of the thermal transfer process, the working fluid may undergo a phase change from a liquid form to a gas form and vice versa. However, in existing systems, the presence of high liquid levels in the compressor may cause the entire system to fault. Thus, existing systems may fail to reliably or properly operate when the liquid level in the compressor increases as oil within the compressor draws in refrigerant (e.g., in liquid form) when the compressor is off.

The above-discussed high liquid levels within compressors may be caused by refrigerant being drawn into the oil within the compressor when the compressor is turned off. Isolation resistance of a compressor changes as a liquid level within the compressor changes. As a result, faults within the refrigeration system caused by high liquid levels within the compressor can be mitigated and minimized by monitoring the isolation resistance of the compressor.

Accordingly, embodiments disclosed herein include a method, apparatus, and system for controlling a liquid level within the compressor using a measured isolation resistance of the compressor. Due to the isolation resistance of the compressor changing as the liquid level within the compressor changes, it is possible to determine (using the isolation resistance of the compressor) when the liquid level within the compressor has reached a level that increases a fault risk of the compressor (and the entire system). Thus, the method, apparatus, and system of embodiments disclosed herein enable reduction in the liquid level by activating a heating element to evaporate the refrigerant mixed within the oil when the isolation resistance of the compressor indicates that the liquid level has fallen below a predetermined threshold (e.g., a threshold indicating the that liquid level within the compressor is at a level close to a point where the compressor is at risk of faulting).

FIG. 1 is a block diagram of some embodiments of an HVAC system 100. In some embodiments, the HVAC system 100 comprises a heat pump system that may be selectively operated to implement one or more substantially closed thermodynamic refrigerant cycles to provide a cooling functionality (hereinafter a "cooling mode") and/or a heating functionality (hereinafter a "heating mode"). At least one embodiment may include a system with only a cooling function or only a heating function. The embodiments depicted in FIG. 1 are configured in a cooling mode. The HVAC system 100, in some embodiments, is configured as a split system heat pump system, and generally comprises an indoor unit 102, an outdoor unit 104, and a system controller 106 that may generally control operation of the indoor unit 102 and/or the outdoor unit 104.

FIG. 1 may include one or more components that are the same or similar to one or more other components of the present disclosure (e.g., components that make up an HVACR unit). Further, one or more components of FIG. 1, or aspects thereof, may be incorporated into, or excluded from, various embodiments of the present disclosure without departing from the scope of this disclosure (e.g., to configure the system of FIG. 1 as an HVACR). For example, one or more components of outdoor unit 104 and/or one or more components of indoor unit 102 may be incorporated into one or more of the embodiments of FIG. 2 without departing from the scope of this disclosure. Additionally, in some embodiments, the HVAC system 100 can include more than one indoor unit 102 (e.g., as a multiple evaporator zoned refrigeration system).

Indoor unit 102 generally comprises an indoor air handling unit comprising an indoor heat exchanger 108, an indoor fan 110, an indoor metering device 112, and an indoor controller 124. In some embodiments, the indoor heat exchanger 108 is generally configured to promote heat exchange between a refrigerant carried within internal tubing of the indoor heat exchanger 108 and an airflow that may contact the indoor heat exchanger 108 but that is segregated from the refrigerant.

In some embodiments, the indoor metering device 112 generally comprises an electronically-controlled motor-driven electronic expansion valve (EEV). In some embodiments, however, the indoor metering device 112 comprises a thermostatic expansion valve, a capillary tube assembly, and/or any other suitable metering device.

Outdoor unit 104 generally comprises an outdoor heat exchanger 114, a compressor 116, an outdoor fan 118, an outdoor metering device 120, a switch over valve 122, and an outdoor controller 126. In some embodiments, the outdoor heat exchanger 114 is generally configured to promote heat transfer between a refrigerant carried within internal tubing of the outdoor heat exchanger 114 and an airflow that contacts the outdoor heat exchanger 114 but is segregated from the refrigerant. In some embodiments, the outdoor metering device 120 and/or switch over valve 122 can be optional. For example, the heat pumps can include an outdoor metering device and a switch over valve, but the air conditioners may not. In various embodiments, the outdoor controller 126 can be optional. For example, systems that do not include a heat pump and/or variable speed air conditioner may not include an outdoor controller.

In some embodiments, the outdoor metering device 120 generally comprises a thermostatic expansion valve. In some embodiments, however, the outdoor metering device 120 comprises an electronically-controlled motor driven EEV similar to indoor metering device 112, a capillary tube assembly, and/or any other suitable metering device.

In some embodiments, the switch over valve 122 generally comprises a four-way reversing valve. The switch over valve 122 also comprises an electrical solenoid, relay, and/or other device configured to selectively move a component of the switch over valve 122 between operational positions to alter the flow path of refrigerant through the switch over valve 122 and consequently the HVAC system 100.

In some embodiments, the system controller 106 can generally be configured to selectively communicate with the indoor controller 124 of the indoor unit 102, the outdoor controller 126 of the outdoor unit 104, and/or other components of the HVAC system 100. In some embodiments, the system controller 106 can be configured to control operation of the indoor unit 102, and/or the outdoor unit 104. In some embodiments, the system controller 106 can be configured to monitor and/or communicate with a plurality of temperature sensors associated with components of the indoor unit 102, the outdoor unit 104, and/or the outdoor ambient temperature.

In some embodiments, the system controller 106 is configured for selective bidirectional communication over a communication bus 128. In some embodiments, the system controller 106 can be configured to selectively communicate with components of the HVAC system 100 and/or any other device 130 via a communication network 132.

In some embodiments, the indoor controller 124 can be carried by the indoor unit 102 and can generally be configured to receive information inputs, transmit information outputs, and/or otherwise communicate with the system controller 106, the outdoor controller 126, and/or any other device 130 via the communication bus 128 and/or any other suitable medium of communication. In some embodiments, the indoor controller 124 is included in the thermostat.

In some embodiments, the indoor EEV controller 136 can be configured to receive information regarding temperatures and/or pressures of the refrigerant in the indoor unit 102. More specifically, the indoor EEV controller 136 is configured to receive information regarding temperatures and pressures of refrigerant entering, exiting, and/or within the indoor heat exchanger 108.

In some embodiments, the outdoor controller 126 can be carried by the outdoor unit 104 and can be configured to receive information inputs, transmit information outputs, and/or otherwise communicate with the system controller 106, the indoor controller 124, and/or any other device 130 via the communication bus 128 and/or any other suitable medium of communication. In some embodiments, the outdoor controller 126 is configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116.

Figure 2:
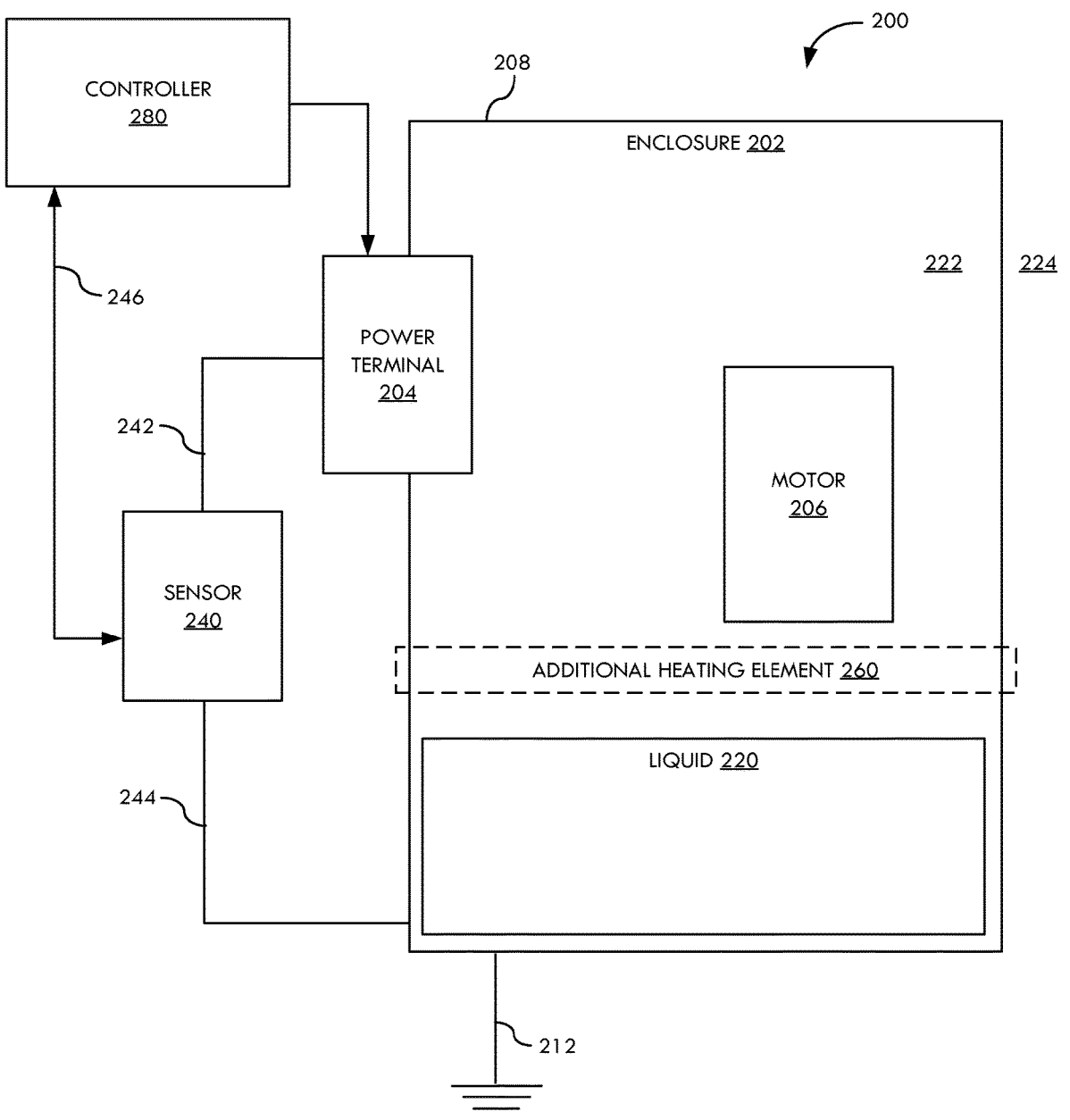
FIG. 2 illustrates various aspects of a compressor with an isolation-resistance-based liquid level control system according to embodiments of the current disclosure.

FIG. 2 illustrates various aspects of compressor system 200 with an apparatus (e.g., controller 280) for controlling a liquid level within a compressor 208 according to embodiments described hereby. In the illustrated embodiment, compressor system 200 comprises a compressor 208. In some embodiments, the compressor 208 includes an enclosure 202 (e.g., a housing), a power terminal 204 (e.g., a power unit), and a motor 206. The enclosure 202 includes an interior 222 and an exterior 224. The interior 222 includes one or more motor(s) 206 and liquid 220. In some embodiments, the liquid 220 can be a mixture of oil and refrigerant. The motor(s) 206 are powered via the power terminal 204, which receives electrical power from the rest of the HVAC system (not shown in FIG. 3). Additionally, the enclosure 202 is connected to an electrical ground 212.

In some embodiments, the compressor system 200 of FIG. 2 further includes a sensor 240. The sensor 240 can be any type of sensor that is able to measure an isolation resistance of the compressor 208. To measure the isolation resistance of the compressor 208, the sensor 240 includes a first terminal 242 coupled to the power terminal 204 of the enclosure 202 and a second terminal 244 grounded to the electrical ground 212 via being coupled to an outer surface (e.g., an outer shell, external surface, etc.) of the enclosure 202.

In some embodiments, the compressor system 200 of FIG. 2 further includes a controller 280. As discussed in more detail below in FIG. 5, the controller 280 includes a processor coupled to memory. The controller 280 can be configured to receive the isolation resistance readings from the sensor 240 via a connection 246 (e.g., a bus, wire, etc.) that electrically couples the sensor 240 to the controller 280. The controller 280 can also be electrically coupled to the power terminal 204 to cause the power terminal to activate one or more heating elements (e.g., the motor 206 and additional heating element 260 discussed below) of the compressor 208. In some embodiments, one example heating element controlled by the controller 280 via the power terminal 204 is the stator of the motor 206 (more specifically, DC current from the variable frequency drive (VFD) into the stator using resistance to heat the liquid 220 within the compressor 208. Additionally, the controller 280 is configured to execute one or all of the process flows discussed below in reference to FIG. 3.

In some embodiments, the compressor 208 includes an additional heating element 260 that is mechanically coupled to the enclosure 202. For example, the additional heating element 260 can be a belly band attached around an external circumference of the enclosure 202. Similar to the motor 206, the additional heating element 260 can be electrically coupled to and receive electrical power through the power terminal 204. In some embodiments, the additional heating element 260 may be a heater with a well that extends into the enclosure 202. The heater can be electrically coupled to and receive electrical power through the power terminal 204 (or alternatively from a separate power source such as a battery and/or power unit of an electric vehicle and/or refrigerated trailer or truck).

FIG. 2 may include one or more components that are the same or similar to one or more other components of the present disclosure. For example, compressor 208 could be the same or similar to compressor 116 of FIG. 1. Further, one or more components of FIG. 2, or aspects thereof, may be incorporated into, or excluded from, various embodiments of the present disclosure without departing from the scope of this disclosure.

Figure 3:
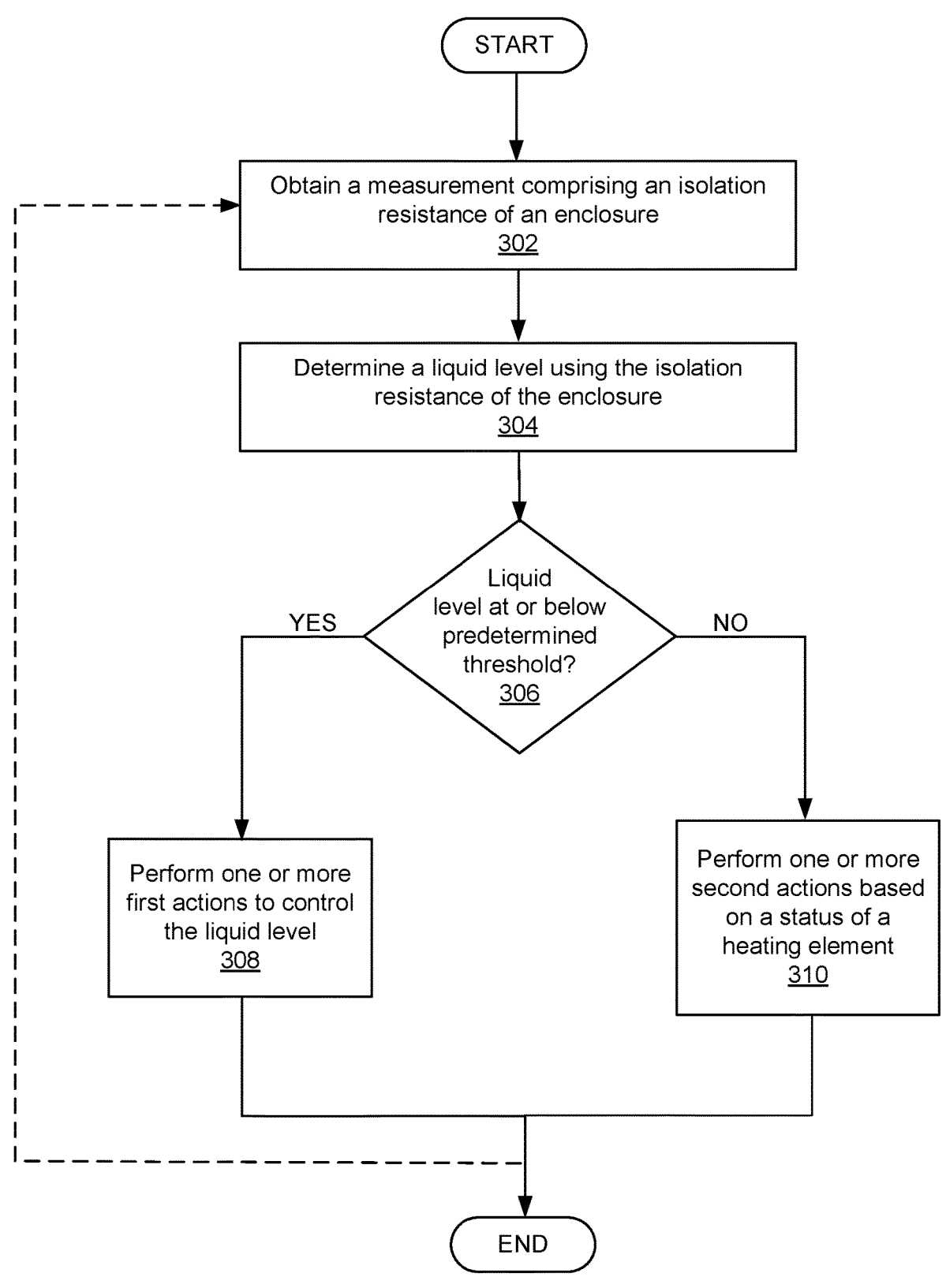
FIG. 3 illustrates an exemplary process flow for controlling a liquid level within an enclosure using an isolation resistance of the enclosure according to embodiments of the current disclosure.

FIG. 3 illustrates one embodiment of a process flow for controlling a liquid level within an enclosure (e.g., enclosure 202 of compressor 208 of FIG. 2) using an isolation resistance of the enclosure, which may be representative of operations that could be executed in various embodiments in conjunction with techniques disclosed hereby. The process flow can be representative of some or all of the operations that could be executed by one or more components/devices/environments described hereby, such as HVAC system 100 or controller 280. The embodiments are not limited in this context.

At block 302, an isolation resistance of the enclosure is obtained by a controller (e.g., controller 280 of FIG. 2). For example, the controller obtains (e.g., receives) the isolation resistance after the isolation resistance is featured measured by a sensor (e.g., sensor 240 of FIG. 2) attached to the enclosure. In some embodiments, the sensor 240 can be configured to continuously measure (e.g., at a predetermined interval set by a user of the HVAC system 100) and transmit the isolation resistance of the enclosure 202 to the controller 280. The predetermined interval can be any amount of time, such as, every 10 seconds, every minute, every hour, etc.

Proceeding to block 304, the controller 280 translates the isolation resistance received from the sensor 240 into a liquid level value. The translation of the isolation resistance to the liquid level value can be based on a predetermined formula and/or algorithm set by the user of the HVAC system 100. The formula and/or algorithm varies based on factors such as, but no limited to, the size and type of the compressor, a characteristic of the oil (e.g., how diluted is the oil), the type of oil, the type of refrigerant, a motor construction of the compressor motor, etc.

Proceeding to block 306, a determination is made (by controller 280) as to whether the liquid level value obtained in block 304 indicates that the liquid level within the compressor is at or has fallen below a predetermined threshold (e.g., a threshold indicating the that liquid level within the compressor is at a level close to a point where the compressor is at risk of faulting). In some embodiments, the predetermined threshold can be a value set by the user of the HVAC system 100 based on various factors such as, but no limited to: a size and type of the compressor, user's comfort level for the liquid level within the compressor reaching a certain height, etc.

At block 306, if the determination is "YES" the process proceeds to block 308 where the controller 280 activates a heating element of the compressor system 200 to evaporate the refrigerant within the oil to reduce the liquid level within the compressor 208. In some embodiments, the heating element can be activated for a predetermined amount of time. The predetermined amount of time can be any amount of time (e.g., one hour, two hours, thirty minutes, etc.) set by the user of the HVAC system 100 that the user believes would lower the liquid level to a level where: (i) the compressor 208 is no longer at risk of faulting and (ii) the level is not too low to effect normal operations of the compressor 208.

Alternatively, if the determination is "NO" at block 306, the process proceeds to block 310. In particular, in some embodiments, if the controller 280 determines at block 310 that the heating element is off and that the liquid level has not fallen below the predetermined threshold, then the one or more second actions would be for the controller 280 to do nothing since the liquid level does not need to be reduced. Alternatively, if the controller 280 determines at block 310 that the heating element is currently on and that the liquid level is no longer below the predetermined threshold, then the controller 280 will turn off the heating element to stop the evaporation of the refrigerant.

As also illustrated in FIG. 3 via the broken-lined arrow connecting blocks 308 and 310 to block 302, the process flow is a recursive process. For example, as discussed above, the sensor 240 can be configured to continuously take isolation resistance readings at a predetermined time interval. As a result, the process flow continues to be repeated as long as controller 280 continues to receive the isolation resistance from the sensor 240. In other embodiments, the controller 280 can be configured to continuously cause the sensor 240 to obtain the isolation resistance measurements. The embodiments are not limited in this context.

Figure 4:
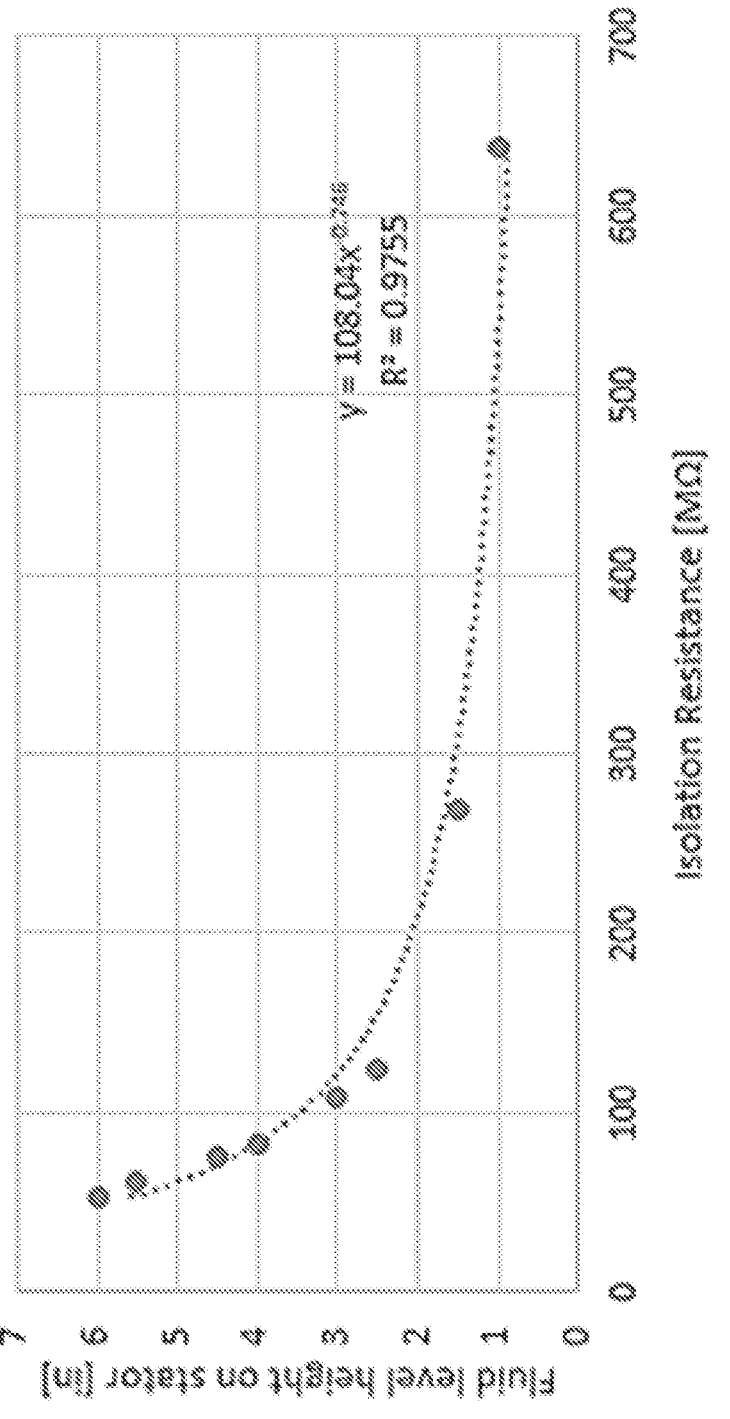
FIG. 4 illustrates a graph demonstrating the relationship between isolation resistance and liquid level according to embodiments of the current disclosure.

FIG. 4 illustrates a graph demonstrating an example of a relationship between an isolation resistance compressor and a liquid level of a fluid mixture (e.g., a mixture of oil, refrigerant, and other fluids) within the compressor. As seen in the graph of FIG. 4, the isolation resistance of the compressor drops as the liquid level increases. Such a drop in the isolation resistance continues as the liquid level continues to increase. As a result, it is possible to set an isolation resistance value as a predetermined threshold for the controller (e.g., controller 280 of FIG. 2) to determine that the liquid levels within the compressor are approaching a level that could put the compressor (and the entire cooling system) at risk of faulting.

For example, based on the graph in FIG. 4, if a fluid level height on the stator of 4 inches would put the system at risk of faulting, the predetermined threshold (discussed above) could be set at 100 M$\Omega$. Thus, when the controller receives an isolation measurement reading of 100 M$\Omega$ or less than 100 M$\Omega$, the controller will know to activate the heating element in order to lower the liquid levels by evaporating the liquid refrigerant from the fluid mixture.

Figure 5:
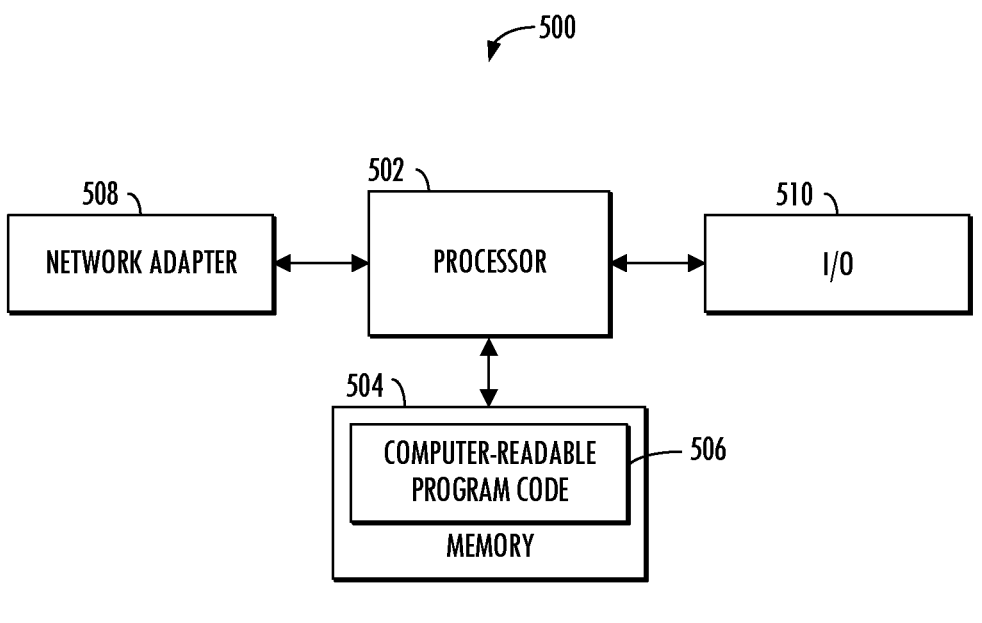
FIG. 5 is an illustration of control circuitry, according to an example embodiment of the present disclosure.

FIG. 5 illustrates the control circuitry 500 according to some example embodiments of the present disclosure. In some embodiments, the control circuit includes some or all of the system controller 106, the indoor controller 124, the outdoor controller 126, and/or controller 280. In some embodiments, the control circuitry includes one or more of each of a number of components such as, for example, a processor 502 connected to a memory 504. The processor is generally any piece of computer hardware capable of processing information such as, for example, data, computer programs and/or other suitable electronic information. The processor includes one or more electronic circuits some of which can be packaged as an integrated circuit or multiple interconnected integrated circuits (an integrated circuit at times more commonly referred to as a "chip"). The processor 502 can be a number of processors, a multi-core processor or some other type of processor, depending on the particular embodiment.

The processor 502 can be configured to execute computer programs such as computer-readable program code 506, which can be stored onboard the processor or otherwise stored in the memory 504. In some embodiments, the processor can be embodied as or otherwise include one or more ASICs, FPGAs, or the like. Thus, although the processor is capable of executing a computer program to perform one or more functions, the processor of various examples can be capable of performing one or more functions without the aid of a computer program.

The memory 504 is generally any piece of computer hardware capable of storing information such as, for example, data, computer-readable program code 506 or other computer programs, and/or other suitable information either on a temporary basis and/or a permanent basis. The memory includes volatile memory such as random-access memory (RAM), and/or non-volatile memory such as a hard drive, flash memory or the like. In various instances, the memory can be referred to as a computer-readable storage medium, which is a non-transitory device capable of storing information. In some embodiments, then, the computer-readable storage medium is non-transitory and has computer-readable program code stored therein that, in response to execution by the processor 502, causes the controller 280 to perform various operations as described herein, some of which in turn causes the HVAC/HVACR system to perform various operations.

In addition to the memory 504, the processor 502 can also be connected to one or more peripherals such as a network adapter 508, one or more input/output (I/O) devices 510 or the like. For example, I/O devices 510 can include an analog to digital converter for converting analog output of the temperature sensors into digital input for a controller. The network adapter 508 is a hardware component configured to connect the control circuitry 500 to a computer network to enable the control circuitry to transmit and/or receive information via the computer network. The I/O devices can include one or more input devices capable of receiving data or instructions for the control circuitry, and/or one or more output devices capable of providing an output from the control circuitry. Examples of suitable input devices include a keyboard, keypad or the like, and examples of suitable output devices include a display device such as a one or more light-emitting diodes (LEDs), a LED display, a liquid crystal display (LCD), or the like.

As explained above and reiterated below, the present disclosure includes, without limitation, the following example implementations.

Example 1. A method comprising: obtaining a first measurement comprising a first isolation resistance of an enclosure, wherein the first isolation resistance is measured between a power unit and an outer shell of the enclosure; using the first isolation resistance to determine a liquid level of one or more liquids contained within the enclosure; and controlling the liquid level, wherein the controlling comprises performing one or more actions based on the liquid level.

Example 2. The method of any of the examples wherein performing the one or more actions based on the liquid level comprises: determining that the liquid level falls below a predetermined threshold; in response to the determination, activating a heating element to reduce the liquid level within the enclosure.

Example 3. The method of any of the examples wherein the liquid level is based on a level of oil and refrigerant within the enclosure, and the first isolation resistance changes as the oil and the refrigerant comes into contact with one or more components housed within the enclosure.

Example 4. The method of any of the examples wherein the refrigerant is in a mixture with the oil, and the liquid level is reduced by using the heating element to evaporate the refrigerant from the oil.

Example 5. The method of any of the examples wherein the enclosure is a compressor comprising a compressor motor, and the heating element a stator of the compressor motor.

Example 6. The method of any of the examples wherein the enclosure is a compressor, and the heating element is belly band attached to an external surface of the compressor.

Example 7. The method of any of the examples further comprising: after the heating element is activated, obtaining a second measurement comprising a second isolation resistance of the enclosure; determining that the second isolation resistance is under the predetermined threshold; and in response to the second isolation resistance being under the predetermined threshold, terminating activation of the heating element.

Example 8. The method of any of the examples wherein the second measurement is obtained after a preset interval has elapsed since the first measurement is obtained.

Example 9. The method of any of the examples wherein the enclosure is part of a refrigeration system, and the predetermined threshold is based on a volume of liquid within the enclosure that would cause a fault in the refrigeration system.

Example 10. The method of any of the examples wherein obtaining the first measurement comprising the first isolation resistance of the enclosure comprises obtaining the first measurement from a sensor attached to the enclosure, and wherein a first terminal of the sensor is attached to the power unit of the enclosure and a second terminal of the sensor is grounded to the outer shell of the enclosure.

Example 11. An apparatus comprising: a memory; and a processor coupled to the memory, wherein the processor is configured to: obtain a measurement comprising an isolation resistance of an enclosure, wherein the isolation resistance is measured between a power unit and an outer shell of the enclosure; use the isolation resistance to determine a liquid level of one or more liquids contained within the enclosure; and control the liquid level, wherein the controlling comprises performing one or more actions based on the liquid level.

Example 12. The apparatus of any of the examples wherein performing one or more actions based on the liquid level comprises, by the processor: determining, that the liquid level falls below a predetermined threshold; in response to the determination, activating a heating element to reduce the liquid level within the enclosure, wherein the heating element is in mechanical contact with the enclosure.

Example 13. The apparatus of any of the examples wherein the liquid level is based on a level of oil and refrigerant within the enclosure, and the isolation resistance changes as the oil and the refrigerant comes into contact with one or more components housed within the enclosure.

Example 14. The apparatus of any of the examples wherein the refrigerant is mixed within the oil, and the liquid level is reduced by using the heating element to evaporate the refrigerant from the oil.

Example 15. The apparatus of any of the examples wherein obtaining the measurement comprising the isolation resistance of the enclosure comprises, by the processor obtaining the measurement from a sensor attached to the enclosure, and wherein a first terminal of the sensor is attached to the power unit of the enclosure and a second terminal of the sensor is grounded to the outer shell of the enclosure.

Example 16. A system comprising: an enclosure; and an apparatus comprising: a memory; and a processor coupled to the memory, wherein the processor is configured to: obtain a measurement comprising an isolation resistance of an enclosure, wherein the isolation resistance is measured between a power unit and an outer shell of the enclosure; use the isolation resistance to determine a liquid level of one or more liquids contained within the enclosure; and control the liquid level, wherein the controlling comprises performing one or more actions based on the liquid level.

Example 17. The system of any of the examples further comprising: a heating element in mechanical contact with the enclosure, wherein performing one or more actions based on the liquid level comprises: determining, by the processor, that the liquid level falls below a predetermined threshold; in response to the determination, activating, using the heating element to reduce the liquid level within the enclosure.

Example 18. The system of any of the examples wherein the liquid level is based on a level of oil and refrigerant within the enclosure, and the isolation resistance changes as the oil and the refrigerant comes into contact with one or more components housed within the enclosure.

Example 19. The system of any of the examples wherein the refrigerant is mixed within the oil, and the liquid level is reduced by using the heating element to evaporate the refrigerant from the oil.

Example 20. The system of any of the examples further comprising: a sensor comprising a first terminal and a second terminal, wherein the first terminal of the sensor is coupled to the power unit of the enclosure and the second terminal of the sensor is grounded to the outer shell of the enclosure, wherein obtaining the measurement comprising the isolation resistance of the enclosure comprises, by the processor, obtaining the measurement from the sensor.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim can be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method comprising:
   obtaining a first measurement comprising a first isolation resistance of an enclosure, wherein the first isolation resistance is measured between a power unit and an outer shell of the enclosure;
   using the first isolation resistance to determine a liquid level of one or more liquids contained within the enclosure;
   determining that the first isolation resistance indicative of the liquid level in the enclosure falls below a predetermined threshold; and
   in response to the determination, activating a heating element to reduce the liquid level within the enclosure.

2. The method of claim 1, wherein the liquid level is based on a level of oil and refrigerant within the enclosure, and the first isolation resistance changes as the oil and the refrigerant comes into contact with one or more components housed within the enclosure.

3. The method of claim 2, wherein the refrigerant is in a mixture with the oil, and the liquid level is reduced by using the heating element to evaporate the refrigerant from the oil.

4. The method of claim 3, wherein
   the enclosure is a compressor comprising a compressor motor, and
   the heating element a stator of the compressor motor.

5. The method of claim 3, wherein
   the enclosure is a compressor, and
   the heating element is a belly band attached to an external surface of the compressor.

6. The method of claim 1, further comprising:
   after the heating element is activated, obtaining a second measurement comprising a second isolation resistance of the enclosure;
   determining that the second isolation resistance is under the predetermined threshold; and
   in response to the second isolation resistance being under the predetermined threshold, terminating activation of the heating element.

7. The method of claim 6, wherein the second measurement is obtained after a preset interval has elapsed since the first measurement is obtained.

8. The method of claim 1, wherein the enclosure is part of a refrigeration system, and the predetermined threshold is based on a volume of liquid within the enclosure that would cause a fault in the refrigeration system.

9. The method of claim 1, wherein obtaining the first measurement comprising the first isolation resistance of the enclosure comprises obtaining the first measurement from a sensor attached to the enclosure, and wherein a first terminal of the sensor is attached to the power unit of the enclosure and a second terminal of the sensor is grounded to the outer shell of the enclosure.

10. An apparatus comprising:
   a memory; and
   a processor coupled to the memory, wherein the processor is configured to:
      obtain a measurement comprising an isolation resistance of an enclosure, wherein the isolation resistance is measured between a power unit and an outer shell of the enclosure;
      use the isolation resistance to determine a liquid level of one or more liquids contained within the enclosure;
      determine that the isolation resistance of the liquid level in the enclosure falls below a predetermined threshold; and
      in response to the determination, activate a heating element to reduce the liquid level within the enclosure, wherein the heating element is in mechanical contact with the enclosure.

11. The apparatus of claim 10, wherein the liquid level is based on a level of oil and refrigerant within the enclosure, and the isolation resistance changes as the oil and the refrigerant comes into contact with one or more components housed within the enclosure.

12. The apparatus of claim 11, wherein the refrigerant is mixed within the oil, and the liquid level is reduced by using the heating element to evaporate the refrigerant from the oil.

13. The apparatus of claim 10, wherein obtaining the measurement comprising the isolation resistance of the enclosure comprises, by the processor obtaining the measurement from a sensor attached to the enclosure, and wherein a first terminal of the sensor is attached to the power unit of the enclosure and a second terminal of the sensor is grounded to the outer shell of the enclosure.

14. A system comprising:
   an enclosure;
   a heating element in mechanical contact with the enclosure; and
   an apparatus comprising:
      a memory; and
      a processor coupled to the memory, wherein the processor is configured to:
         obtain a measurement comprising an isolation resistance of the enclosure, wherein the isolation resistance is measured between a power unit and an outer shell of the enclosure;
         use the isolation resistance to determine a liquid level of one or more liquids contained within the enclosure;
         determine that the isolation resistance indicative of the liquid level in the enclosure falls below a predetermined threshold; and
         in response to the determination, activate the heating element to reduce the liquid level within the enclosure.

15. The system of claim 14, wherein the liquid level is based on a level of oil and refrigerant within the enclosure, and the isolation resistance changes as the oil and the refrigerant comes into contact with one or more components housed within the enclosure.

16. The system of claim 15, wherein the refrigerant is mixed within the oil, and the liquid level is reduced by using the heating element to evaporate the refrigerant from the oil.

17. The system of claim 16, further comprising:

a sensor comprising a first terminal and a second terminal,
wherein the first terminal of the sensor is coupled to the
power unit of the enclosure and the second terminal of
the sensor is grounded to the outer shell of the enclo-
sure, wherein obtaining the measurement comprising the iso-
lation resistance of the enclosure comprises, by the
processor, obtaining the measurement from the sensor.

\* \* \* \* \*